Patented Aug. 8, 1933

1,921,566

UNITED STATES PATENT OFFICE 1,921,566

PRODUCTION OF VALUABLE PRODUCTS FROM TALL OIL

Hans Franzen, Mannheim, and Robert Held, Leverkusen, Germany, assignors to I. G. Farbenindustrie Aktiengesellschaft, Frankfort-on-the-Main, Germany No Drawing. Application October 31, 1932, Serial No. 640,502, and in Germany November 5, 1931

6 Claims. (Cl. 87—12)

The present invention relates to the production of valuable products from tall oil, that is from the resinous and fatty by-product obtainable in the production of paper pulp by means of the so-called sulphate process, in which wood is digested with an alkaline liquor containing sodium sulphide and "tall oil" accumulates at the surface of the waste-liquors after the digestion, especially of resin-bearing wood.

It is already known that a splitting up of tall oil into its two main components, namely fatty acids and resinic acids, may be effected by subjecting the carboxylic acids contained in the tall oil to esterification with monohydric alcohols of low boiling point, whereby the fatty acids are mainly esterified and the resinic acids remain in the free state, and then separating the non-esterified resinic acids from the fatty acid esters with the aid of alkali or by extraction or distillation. A substantial percentage of resinic acids remaining, however, in the fatty acid esters.

We have now found that the fatty acids and resinic acids of tall oil can be recovered and separated in the free or in the water-soluble state and thus in a very advantageous manner by esterifying the whole carboxylic acids in known manner with polyhydric alcohols, as for example ethylene glycol, α, β- or α, propylene glycols, 1.2-, 1.3- or 1.4-butylene glycols, glycerol, glycerol mono-alkyl ethers, di-ethyleneglycol, erythritol, mannitol or sorbitol, then subjecting the resulting esterification product to a catalyzed splitting process, thus effecting the splitting of the fatty acid esters only, and finally separating the fatty acids from the resulting mixture of fatty acids, alcohols and esters of the resinic acids in any usual and convenient manner. By the term "catalyzed splitting" we wish to define that the cleavage is carried out, without the formation of soaps, in the presence of water and is accelerated by heating in a closed pressure-tight vessel to temperatures above the boiling point of water, say to from about 120° to about 230° C., and/or by heating in the presence of catalysts assisting the splitting, such as the so-called Twitchell splitters, that is sulpho fatty acids or similar sulphonated organic bodies as are described in the U. S. Patents Nos. 601,603 and 628,503. Instead of the sulpho fatty acids of the first-mentioned patent and the sulphonic acids of arylated fatty acids of the later patent also similar bodies, as for example the products obtainable by acting with a sulphonating agent on wool fat or alcohols therefrom, on castor oil or mixtures thereof with naphthalene or like aromatic hydrocarbons, on mineral oil fractions whereby the so-called mahogany sulphonic acids may be obtained, on naphthalene, alkyl homologues thereof or anthracene or octohydro-anthracene, on tar oils or naphthenic acids, or mixtures of the said bodies with each other or with non-oxidizing mineral acids, such as sulyphuric acid, may be employed in the said splitting. On working at superatmospheric pressure other catalysts than the said Twitchell splitters may be also employed as for example powdered tin, zinc, zinc oxide, small quantities of alkalies insufficient for a saponification as for example of alkali metal hydroxides, alkaline earth metal oxides and strong non-oxidizing mineral acids.

Crude tall oil and also tall oil which has previously been purified, as for example by distillation, may be employed as initial material. During the esterification of the carboxylic acids contained in the tall oil with the said polyhydric alcohols fatty acid esters and resinic acid esters are formed. The former are then split into free fatty acids and the corresponding alcohols by the employment of the said catalyzed splitting methods, as for example by treatment with zinc dust and water at superatmospheric pressures or according to the process of Twitchell. The resinic acid esters remain practically unattacked. Since the resinic acid esters formed during the esterification are not volatile even at the rather high temperatures of distillation such as from 150° to 250° C., it is possible to remove the free fatty acids from the split product by distillation. The recovery of the fatty acids may be effected for example by distillation under reduced pressure, by the introduction of superheated steam or other inert gases or vapors, or by the introduction of inert liquids of low boiling point into the highly heated mixture which is in vacuo, whereby at the same time gases or vapors of the aforesaid nature may be employed as carriers for the finely divided liquids, as described for example in the U. S. Patents Nos. 1,622,126 and 1,871,051 and the application for U. S. Patent No. 562,056, filed September 10th, 1931. Alcohols resulting from the splitting operation, are simultaneously removed from the reaction mixture and may be recovered and separated from the fatty acids by fractional cooling of the vapors whereby the fatty acids are condensed first and then the alcohols. After distilling off the fatty acids, the residue contains the resinic acids in the form of their esters as well as the preponderating part of any unsaponifiable constituents present in the tall oil. The resinic acids may readily be obtained in the free form by saponification of the resinic acid esters with alkali and subsequent acidification of the soaps. It is also possible, however, to convert the fatty acids into salts by the addition of aqueous solutions of alkali at temperatures up to say 90° C. to the split mixture without a saponification of the resinic acid esters the soaps then being separated in the usual manner from the resinic acid esters and the unsaponifiable constituents. The solutions of soaps obtained may be freed from the polyhydric alcohols employed for the previous esterification by an extraction of the solutions with water-insoluble organic solvents, such as ethyl ether, chloroform, carbon tetrachloride, di-, tri- or tetrachlorethylene, ethylenechloride, benzine, petroleum ether or benzene, so that pure soap solutions are obtained and the alcohols may be recovered.

The following examples will further illustrate the nature of this invention but the invention is not restricted to these examples.

Example 1

Tall oil which has been purified by distillation at about 250° C. and 20 millimeters of mercury and has a content of 35 percent of resinic acids, 56 percent of fatty acids and about 8 percent of unsaponifiable constituents such as hydrocarbon and phytosterol, is heated under a pressure of 100 millimeters (mercury gauge) in the course of 4 hours up to 230° C. with an amount of glycerin 5 per cent in excess of the amount theoretically required according to the acid value of the oil with an addition of 0.3 per cent by weight of the tall oil of tin powder while stirring, whereby the carboxylic acids present in the tall oil are esterified. The resulting esterification product having an acid value of 5 is heated for 4 hours at 180° C. in an autoclave with an equal amount of water and 0.5 percent by weight of the esterification product of zinc dust, whereby mainly the fatty acid esters are split. The split product has an acid value of 120. It is subjected, at a temperature of 240° C., to a distillation under reduced pressure with wet steam according to the U. S. Patent No. 1,622,126. The distillate consists of 85 per cent of the fatty acids contained in the initial material having a content of 3 per cent of resinic acids and 3 per cent of unsaponifiable constituents.

Example 2

Crude tall oil consisting to the extent of 28 percent of resinic acids and of 65 percent of fatty acids and having a content of about 6.5 percent of unsaponifiable constituents is esterified under a pressure of 200 millimeters (mercury gauge) with ethylene glycol in the manner described in Example 1. The esterification product, having an acid value of 6, is split according to the process of Twitchell by heating with from 30 to 40 per cent of its weight of water, from 1 to 2 per cent of octohydroanthracene sulphonic acid and 0.5 per cent of concentrated sulphuric acid for about 20 hours to about 98° C. and yields a split product having an acid value of 112. By subsequent distillation of the split product under a pressure of 35 millimeters (mercury gauge) with superheated steam, 78 per cent of the fatty acids contained in the initial material are obtained containing 3 per cent of resinic acids and 3 per cent of unsaponifiable constituents.

What we claim is:

1. The process for separating fatty acid and resinic acid materials of tall oil which comprises esterifying both the said materials with a polyhydric alcohol, subjecting the resulting mixture to a catalyzed splitting in the presence of water while heating and separating the resulting free fatty acids from resinic acid esters.

2. The process for separating fatty acid and resinic acid materials of tall oil which comprises esterifying both the said materials with a polyhydric alcohol, heating the resulting mixture in the presence of water in a closed vessel to a temperature above the boiling point of water and separating the resulting free fatty acids from resinic acid esters.

3. The process for separating fatty acid and resinic acid materials of tall oil which comprises esterifying both the said materials with a polyhydric alcohol, heating the resulting mixture in the presence of water and of an agent capable of assisting splitting in a closed vessel to a temperature above the boiling point of water and separating the resulting free fatty acids from resinic acid esters.

4. The process for separating fatty acid and resinic acid materials of tall oil which comprises esterifying both the said materials with a polyhydric alcohol, heating the resulting mixture in the presence of water and of a water-soluble sulphonic acid of an organic compound and separating the resulting free fatty acids from resinic acid esters.

5. The process for separating fatty acid and resinic acid materials of tall oil which comprises esterifying both the said materials with a polyhydric alcohol, heating the resulting mixture in the presence of water and of a sulphonic acid of a fatty acid of high molecular weight and separating the resulting free fatty acids from resinic acid esters.

6. The process for separating fatty acid and resinic acid materials of tall oil which comprises esterifying both the said materials with a polyhydric alcohol, heating the resulting mixture in the presence of water and of a sulphonic acid of an arylated fatty acid of high molecular weight, and separating the resulting free fatty acids from resinic acid esters.

HANS FRANZEN.
ROBERT HELD.